(12) United States Patent
Subramanian et al.

(10) Patent No.: US 9,774,640 B2
(45) Date of Patent: Sep. 26, 2017

(54) METHOD AND SYSTEM FOR SHARING APPLICATIONS AMONG A PLURALITY OF ELECTRONIC DEVICES

(71) Applicant: Samsung Electronics Co., Ltd., Suwon-si, Gyeonggi-do (KR)

(72) Inventors: Muthukumar Subramanian, Noida (IN); Riteshkumar Verma, Noida (IN); Anurag Tripathi, Noida (IN); Kumar Atul, Noida (IN); Pankaj Mishra, Noida (IN); Sujitkumar Sinha, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/539,364

(22) Filed: Nov. 12, 2014

(65) Prior Publication Data
US 2015/0135269 A1    May 14, 2015

(30) Foreign Application Priority Data
Nov. 11, 2013    (IN) .......................... 5068/CHE/2013

(51) Int. Cl.
*G06F 7/04*    (2006.01)
*H04L 29/06*    (2006.01)
(Continued)

(52) U.S. Cl.
CPC .......... *H04L 65/403* (2013.01); *H04L 63/08* (2013.01); *H04W 4/008* (2013.01); *H04W 12/06* (2013.01)

(58) Field of Classification Search
CPC ... H04L 63/08; H04L 65/403; H04L 67/1097; H04W 12/06; H04W 4/008
(Continued)

(56) References Cited

U.S. PATENT DOCUMENTS 8,291,378 B2 * 10/2012 Arnold ...................... G06F 8/61
717/104
8,640,204 B2 * 1/2014 Karaoguz ............... G06F 21/10
726/2

(Continued)

OTHER PUBLICATIONS http://windows.microsoft.com/en-us/windows    8/multiple-monitors#1tc=T1.

*Primary Examiner* — Samson Lemma
(74) *Attorney, Agent, or Firm* — Jefferson IP Law, LLP

(57) ABSTRACT

A method and system for sharing an application among a plurality of electronic devices includes registering the plurality of electronic devices with a first electronic device. The method includes storing information regarding device capabilities of the plurality of electronic devices in a device information database. The method includes storing information regarding requirements of the application in the device information database. The plurality of electronic devices is selected by the first electronic device. The method includes executing the application in the first electronic device as a request initiated by second electronic device. Execution is performed by utilizing processor resources in the first electronic device. The method includes maintaining synchronization of the first electronic device and the plurality of electronic devices. The method includes rendering output data of the application in at least one of the plurality of electronic devices.

16 Claims, 10 Drawing Sheets

(51) Int. Cl.
*H04W 4/00* (2009.01)
*H04W 12/06* (2009.01)

(58) Field of Classification Search
USPC .............................................................. 726/3
See application file for complete search history.

(56) References Cited

U.S. PATENT DOCUMENTS

| | | | |
|---|---|---|---|
| 8,676,985 B2* | 3/2014 | Assuncao | H04M 1/72569 |
| | | | 709/226 |
| 9,055,120 B1* | 6/2015 | Firman | G06F 8/60 |
| 9,059,747 B2* | 6/2015 | Wang | H04B 5/0031 |
| 9,208,483 B2* | 12/2015 | Corda | G06Q 20/223 |
| 2003/0206313 A1* | 11/2003 | Ferlitsch | G06F 3/1211 |
| | | | 358/1.15 |
| 2004/0148515 A1* | 7/2004 | Kikuchi | H04W 12/08 |
| | | | 726/4 |
| 2004/0267808 A1* | 12/2004 | Matsushima | H04L 67/02 |
| 2007/0220049 A1* | 9/2007 | Hwang | G11B 27/034 |
| 2011/0191695 A1* | 8/2011 | Dinka | G06F 3/0481 |
| | | | 715/753 |
| 2012/0159472 A1* | 6/2012 | Hong | H04L 12/1813 |
| | | | 717/178 |
| 2012/0254941 A1* | 10/2012 | Levien | G06F 21/00 |
| | | | 726/3 |
| 2014/0258441 A1* | 9/2014 | L'Heureux | H04W 12/06 |
| | | | 709/217 |

* cited by examiner

FIG. 10
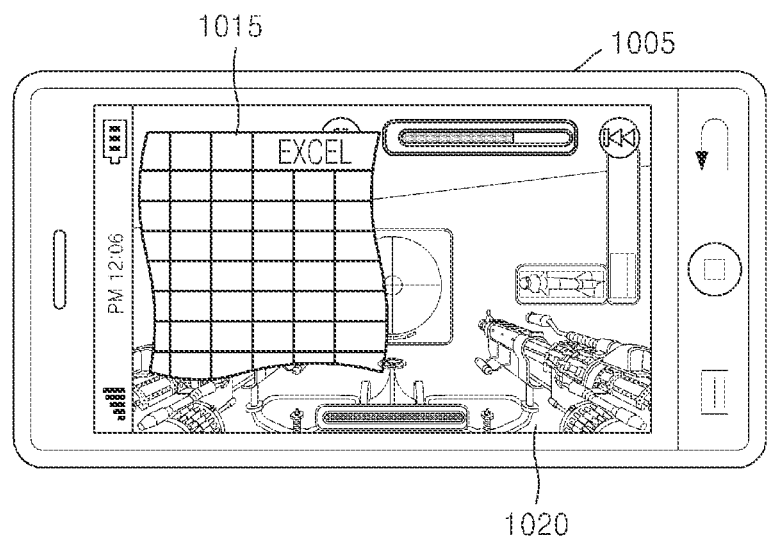
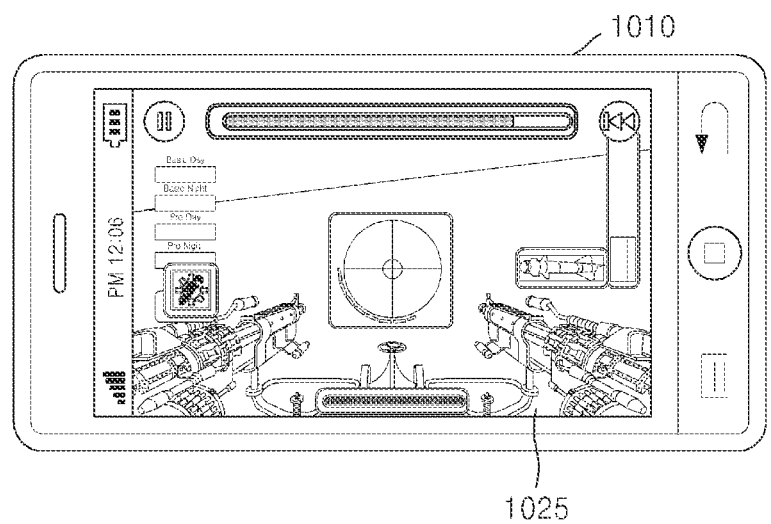

METHOD AND SYSTEM FOR SHARING APPLICATIONS AMONG A PLURALITY OF ELECTRONIC DEVICES

CROSS-REFERENCE TO RELATED APPLICATION(S)

This application claims the benefit under 35 U.S.C. §119(a) of an Indian patent application filed on Nov. 11, 2013 in the Indian Intellectual Property Office and assigned Serial number 5068/CHE/2013, the entire disclosure of which is hereby incorporated by reference.

TECHNICAL FIELD

The present invention relates to the field of rendering applications in electronic devices, and more specifically to the field of sharing an application by an electronic device with multiple other electronic devices.

BACKGROUND

With the advent of smart televisions, smart music systems, and smart phones, application developers have been developing applications capable of functioning in a wide spectrum of electronic devices. An application fails to deliver an optimal performance on an electronic device lacking necessary hardware for the application. However, electronic devices having adequate hardware in one respect are found lacking in hardware in other respects. For example, a smart phone having adequate processor hardware to run an application may lack adequate output hardware for the application. In such a situation, the application fails to deliver the optimal performance. Moreover, the application fails to run in the smart phone if the smart phone lacks the adequate processor hardware for the application.

Hardware capabilities of electronic devices are unequally distributed among a plurality of electronic devices in the market. As a consequence, number of applications equally compatible with the plurality of electronic devices is limited. Existing systems lack a platform to develop device independent applications.

In one existing prior art, a first electronic device lacking a required hardware to run a first application is provided with an auxiliary terminal with the required hardware component. For example, a computer is connected with an auxiliary display terminal when a first display terminal of the computer fails to deliver optimal performance for a second application.

In another existing prior art, output image data of an application from a first electronic device is transmitted to a second electronic device. Amount of the image data shared to the second electronic device is decided by a user on the first electronic device via a window selection component. However, the second electronic device is denied control over the executed applications. Moreover, a user on the first electronic device controls amount of image data to be shared with the second electronic device.

In light of the foregoing discussion, there is a need for a system to share an application residing in a first electronic device to a second electronic device and execute the application with a processor in the first electronic device.

SUMMARY

The above mentioned needs are met by employing a system allowing applications to be shared among a plurality of electronic devices. The system allows a first electronic device to execute the application in a processor in the first electronic device. Further, the first electronic device transmits output of the application to a second electronic device and allows the second electronic device to control the application execution.

An example of a method of sharing an application among a plurality of electronic devices includes registering the plurality of electronic devices with a first electronic device. The plurality of electronic devices is selected by the first electronic device. The method includes executing the application in the first electronic device. Execution is performed by utilizing processor resources in the first electronic device. Furthermore, the method includes rendering output data of the application in at least one of the plurality of electronic devices.

Another example of a method of sharing an application among a plurality of electronic devices includes registering the plurality of electronic devices to a first electronic device. The plurality of electronic devices is in vicinity of the first electronic device. Further, the method includes storing information regarding device capabilities of the plurality of electronic devices in a device information database. Moreover, the method includes registering the application in the first electronic device. Registering includes storing information regarding requirements of the application in the device information database. Furthermore, the method includes generating an event on registration of the application. The event is generated in an application layer of the first electronic device. The method includes communicating the event with a Resource Sharing Infrastructure (RSI) layer via a second application program interface (API). The method includes selecting a second electronic device from the plurality of electronic devices. The second electronic device is capable of utilizing the shared application. The method includes sending a first message to the second electronic device via the second API. The message is generated from the event. The method includes receiving a second message from the second electronic device via a third API. The method includes authenticating the second electronic device and the shared application. Further, the method includes maintaining synchronization of the first electronic device and the second electronic device. Furthermore, the method includes executing the application in the first electronic device. Execution is performed by utilizing processor resources in the first electronic device. The method includes rendering output data of the executed application in the second electronic device.

An example of a system for sharing an application among a plurality of electronic devices includes an application layer for storing applications capable of being shared among the plurality of electronic devices. Further, the system includes a network abstraction layer for communicating information with a plurality of electronic devices. The system includes a Resource Sharing Infrastructure (RSI) layer for facilitating resource sharing. The RSI layer includes a device information database for storing information regarding device capabilities of the plurality of electronic devices. Further, the RSI layer includes a device grouping module for managing information regarding the plurality of electronic devices. Further, the RSI layer includes an event manager for handling network events related to sharing of the application. Furthermore, the RSI layer includes an event database to store an event queue, wherein the event queue stores unprocessed events. The RSI layer includes a security enforcement manager for handling enforcing the security events measures in the RSI layer related to sharing of the application. The RSI layer includes a resource sharing and scheduling manager for scheduling tasks for the plurality of electronic devices. The RSI layer includes a communication manager for maintaining communication with the network abstraction layer. The communication manager maintains communication via a first Application Program Interface (API) and a second API.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 10 is an exemplary illustration of sharing an application between two mobile devices.

DETAILED DESCRIPTION

Embodiments of the present disclosure described herein provide a method and system for sharing an application residing in a first electronic device among a plurality of electronic devices. Execution of the application occurs in the first electronic device utilizing the first device processor resources. The present invention permits a second electronic device receiving the application to control execution of the application. Further, output data of the executed application is output from output terminals of the second electronic device.

Figure 1:
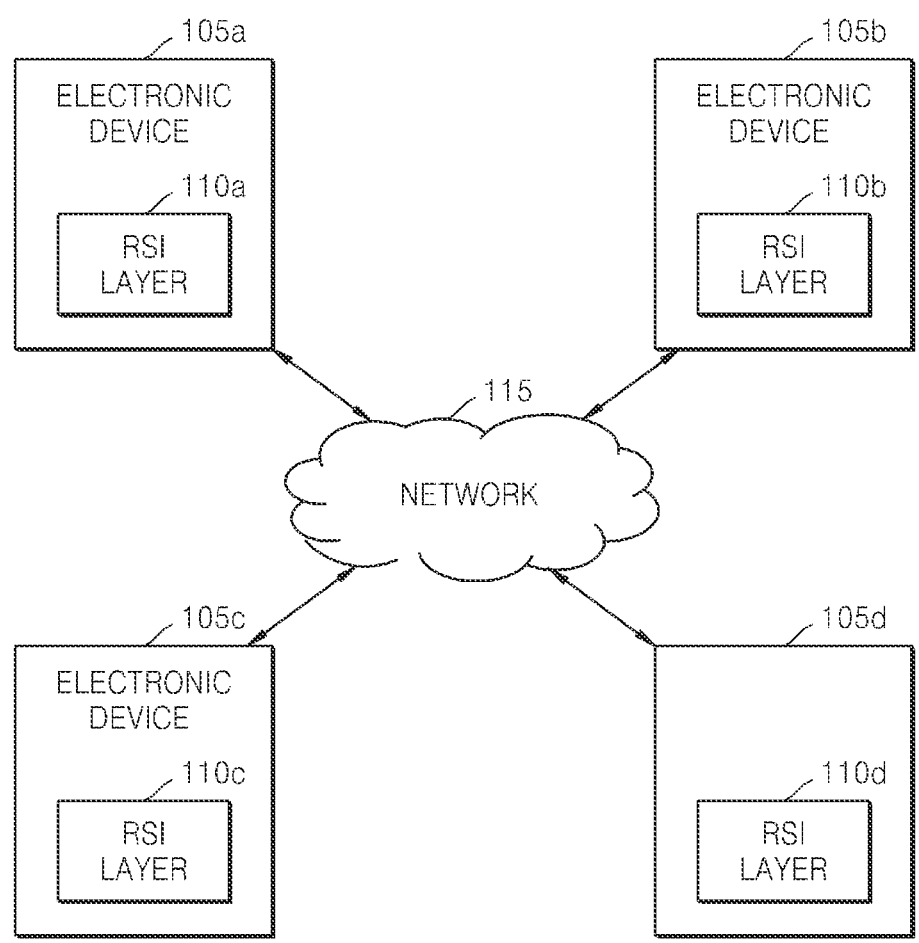
FIG. 1 is a block diagram of an environment, in accordance with which various embodiments of the present invention can be implemented.

FIG. 1 is a block diagram of an environment, in accordance with which various embodiments can be implemented. The environment includes a plurality of electronic devices 105a, 105b, 105c and 105d. The plurality of electronic devices 105a, 105b, 105c and 105d are in communication with each other via a network 115.

In one embodiment of the present invention, a first electronic device 105a is capable of sharing an application with electronic devices 105b, 105c and 105d via the network 115. A Resource Sharing Infrastructure (RSI) layer in each electronic device of the plurality of electronic devices 105a, 105b, 105c and 105d enables sharing of the application via the network 115.

The first electronic device 105a includes a first RSI layer 110a. A second electronic device 105b includes a second RSI layer 110b. A third electronic device 105c includes a third RSI layer 110c. A fourth electronic device 105d includes a fourth RSI layer 110d. Examples of the plurality of electronic devices 105a, 105b, 105c and 105d include but are not limited to smart televisions, laptops, tablet computers, personal digital assistants, and smart phones. The RSI layer is explained in detail in conjunction with FIG. 2.

The application is stored and executed in the first electronic device 105a. However, output data of the application is transmitted to the electronic devices 105b, 105c and 105d, capable of utilizing the shared application. As a result, the output data is rendered via output terminals in the electronic devices among the plurality of electronic devices 105b, 105c and 105d.

Figure 2:
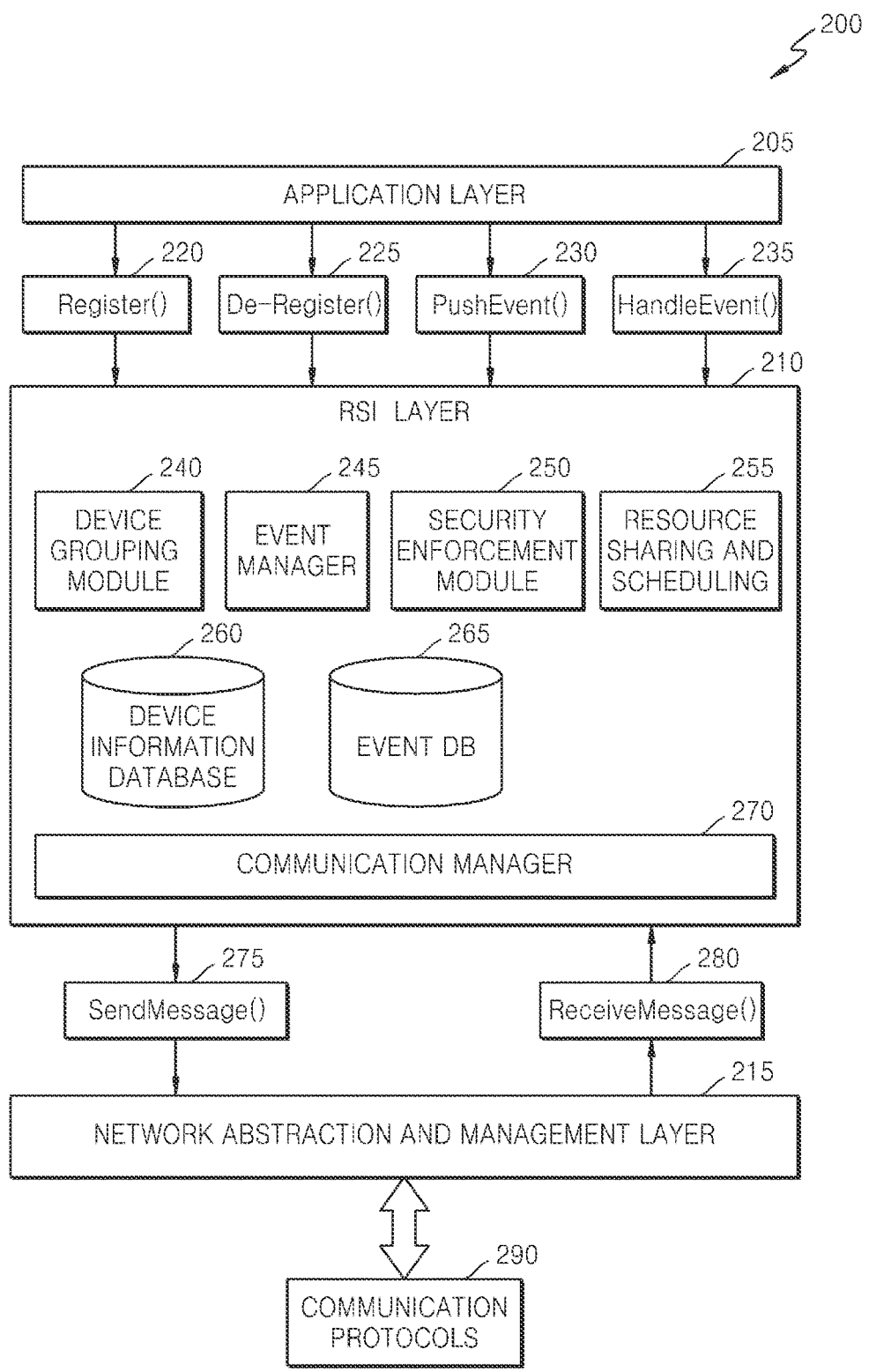
FIG. 2 depicts a system for sharing an application among a plurality of electronic devices, in accordance with one embodiment of the present invention.

Referring to FIG. 2 now, a system 200 for sharing an application among a plurality of electronic device includes an application layer 205, an RSI layer 210, and a network abstraction and management layer 215. Applications in the application layer 205 communicate with the RSI layer 210 via a plurality of application program interfaces (API) 220, 225, 230 and 235. The RSI layer 210 includes a device grouping module 240, an event manager 245, a security enforcement module 250, a resource sharing and scheduling module 255, a device information database 260, an event database 265 and a communication manager 270.

The system 200 enables sharing of applications in a first electronic device with other recipient electronic devices. Execution of the application occurs in the first electronic device. The output of the shared application is rendered via the recipient electronic devices. Moreover, control input data for the application is received from the recipient electronic devices. The system 200 selects the recipient electronic devices based on requirements of the application to be shared and device capabilities of the recipient electronic devices. As a result, it is necessary to collect and store the device capabilities of the plurality of electronic devices in the system 200. Moreover, the system 200 has to collect the requirements of the application prior to sharing the application.

The application layer 205 stores applications capable of being shared via the system 200. A register( ) API 220 among the plurality of API 220, 225, 230 and 235 enables the application to announce the requirements of the application to the recipient electronic devices via the RSI layer 210. The requirements of the application are stored in the device information database 260 of the first electronic device. The requirements of the application include but are not limited to software specifications and hardware specifications required by the application to deliver an optimal performance.

An electronic device after arriving in the vicinity of the first electronic device transmits device capability of the electronic device to the first electronic device. The device capabilities of the electronic device are stored in the device information database 260 present in the RSI layer 210. The electronic device is registered to the first electronic device when the device capabilities of the electronic device are stored in the device information database 260 of the first electronic device. Examples of the device capabilities include but are not limited to processing speed, display hardware, input terminal, proximity, network connectivity of the recipient electronic devices.

The RSI layer 210 sends periodic messages to the recipient electronic devices registered to the first electronic device enquiring device capabilities of the recipient electronic devices. The recipient electronic devices responds by sending data regarding the latest device capabilities to the RSI layer 210. The device information database 260 stores and maintains data regarding the latest device capabilities collected from the recipient electronic devices. The device grouping module 240 manages information regarding the device capabilities of the recipient electronic devices.

The system 200 shares the application with the recipient electronic devices in the form of events. The events carry output data of the shared application to the recipient electronic device. The events carry control input data to the shared application from the recipient electronic devices. A PushEvent( ) API 230 carry the events from the shared application to the recipient electronic device via the RSI layer 210. A HandleEvent( ) API 235 carry the events to the shared application from the recipient electronic devices and process the events. Data associated with the events are handled by the event manager 245. The events in the RSI layer 210 are stored in the event database 265 prior to processing.

On sharing an application the recipient electronic device and the application is authorised by the security enforcement module 250. The plurality of electronic devices have inbuilt security policy to maintain data security. The security enforcement module 250 enforces the security policy during application sharing. The security policy is enforced by means of security measures. Examples of the security measures include but is not limited to user based security measures, content based security measures, and hardware based security measures.

The resource sharing and scheduling module 255 breaks the shared application into task and subtasks. The tasks and sub-tasks are communicated to the recipient electronic devices with best suited capabilities to render output of the shared application. Execution of the shared application occurs in the first electronic device. Further, the resource sharing and scheduling application maintains synchronization between the first electronic device and the second electronic device.

The events are communicated with the recipient electronic devices in the form of messages. The communication manager 270 manages sending the messages with other devices via a SendMessage( ) API 275. The communication manager 270 manages reception of the messages via a ReceiveMessage( ) API 280. The network abstraction and management layer 215 enables communication with the plurality of electronic devices via communication protocols 290. Examples of communication protocols include, but are not limited to WIFI-Direct, WIFI, ZigBee, Near field communication (NFC), sound based communication, multimedia based communication like image & video and Bluetooth. The application calls a de-register( ) API 225 among the plurality of API 220, 225, 230 and 235 to de-register from the recipient electronic devices.

Figure 3:
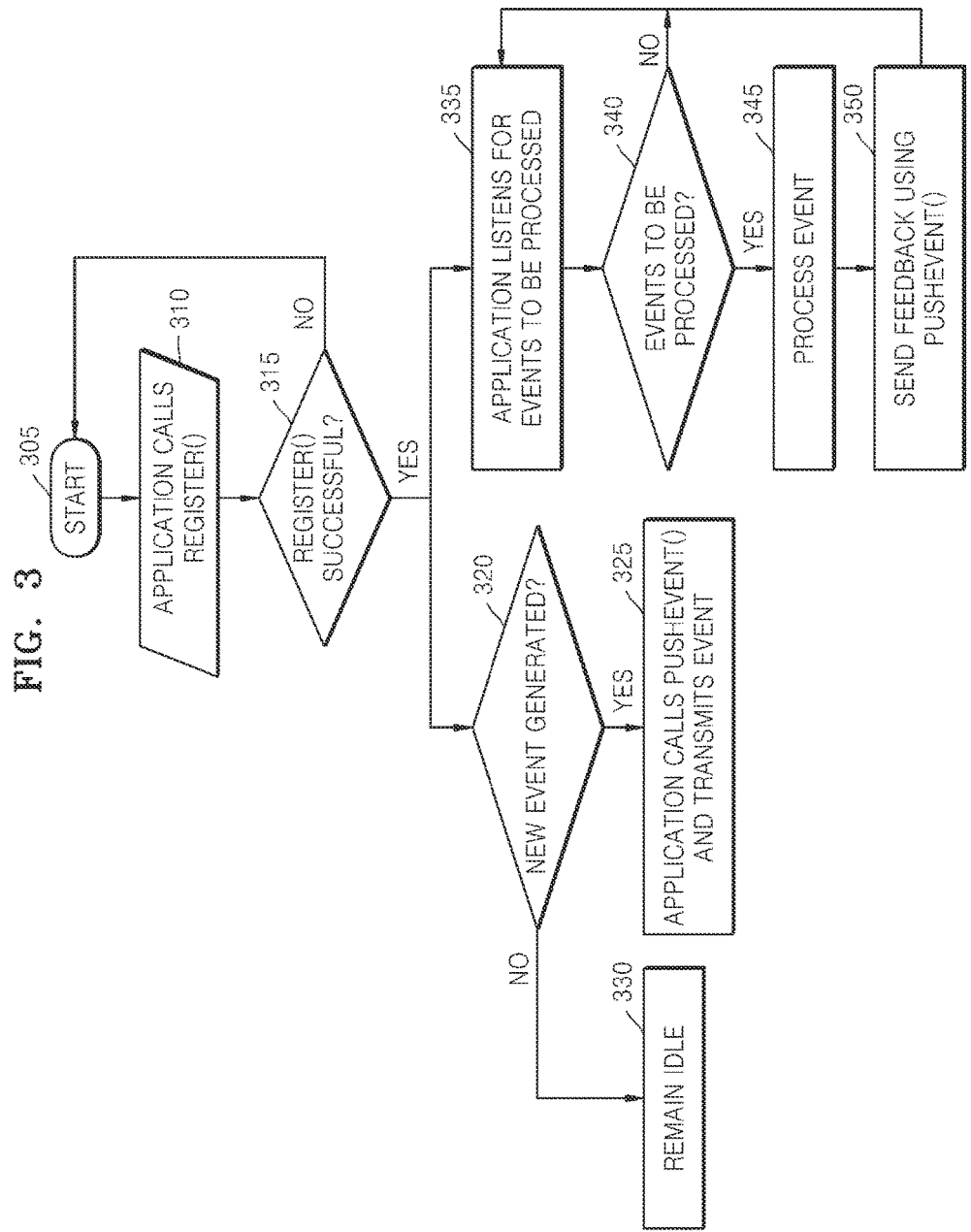
FIG. 3 is a flowchart illustrating functioning of application layer, in accordance with one embodiment of the present invention.

FIG. 3 is a flowchart illustrating functioning of an application layer, in accordance with one embodiment of the present invention. Further, the flowchart illustrates sharing of an application stored in the application layer of a first electronic device. The flowchart begins at step 305.

At step 310, the application transmits requirements for optimal performance via a Register( ) API. The Register( ) API causes an application layer to transmit the requirements of the application to be sent to an RSI layer. The RSI layer searches for a second electronic device capable of rendering output of the application based on device capabilities information in a device information database. The second electronic device connects with the first electronic device.

At step 315 outcome of the Register( ) API is checked. Success of the Register( ) API implies the second electronic device capable of rendering output of the application is connected to the first electronic device. The process moves to step 305 if the outcome of Register( ) API is not successful. The process moves to step 320 and step 335 if the outcome of Register( ) API is successful.

At step 320, the process checks if a new event is generated. Sharing of the application between the first electronic device and the second electronic device occurs in the form of events. The process moves to step 330 if new event is not generated. The application remains idle at step 330. Step 325 is performed if a new event has been generated.

At step 325, the application transmits the event to the RSI layer via a PushEvent( ) API. The RSI layer transmits data associated with the event to the second electronic device. The second electronic device responds to the event by sending messages to the first electronic device. The messages sent by the second electronic device are incoming events.

At step 335 the application listens for the incoming events from the electronic device. The data associated with the events are handled by an event manager in the RSI layer.

At step 340, the application monitors if the incoming event is received by the RSI layer. The application performs step 345 if there are incoming events to be processed. The process reverts to step 335 if there are no incoming events.

At step 345, the HandleEvent( ) API processes the incoming events. The HandleEvent( ) API extracts the necessary data from the incoming event and transmits the data to the application. Execution of the application is controlled with the extracted data.

At step 350, the application sends feedback to the electronic device via the PushEvent( ) API.

Figure 4:
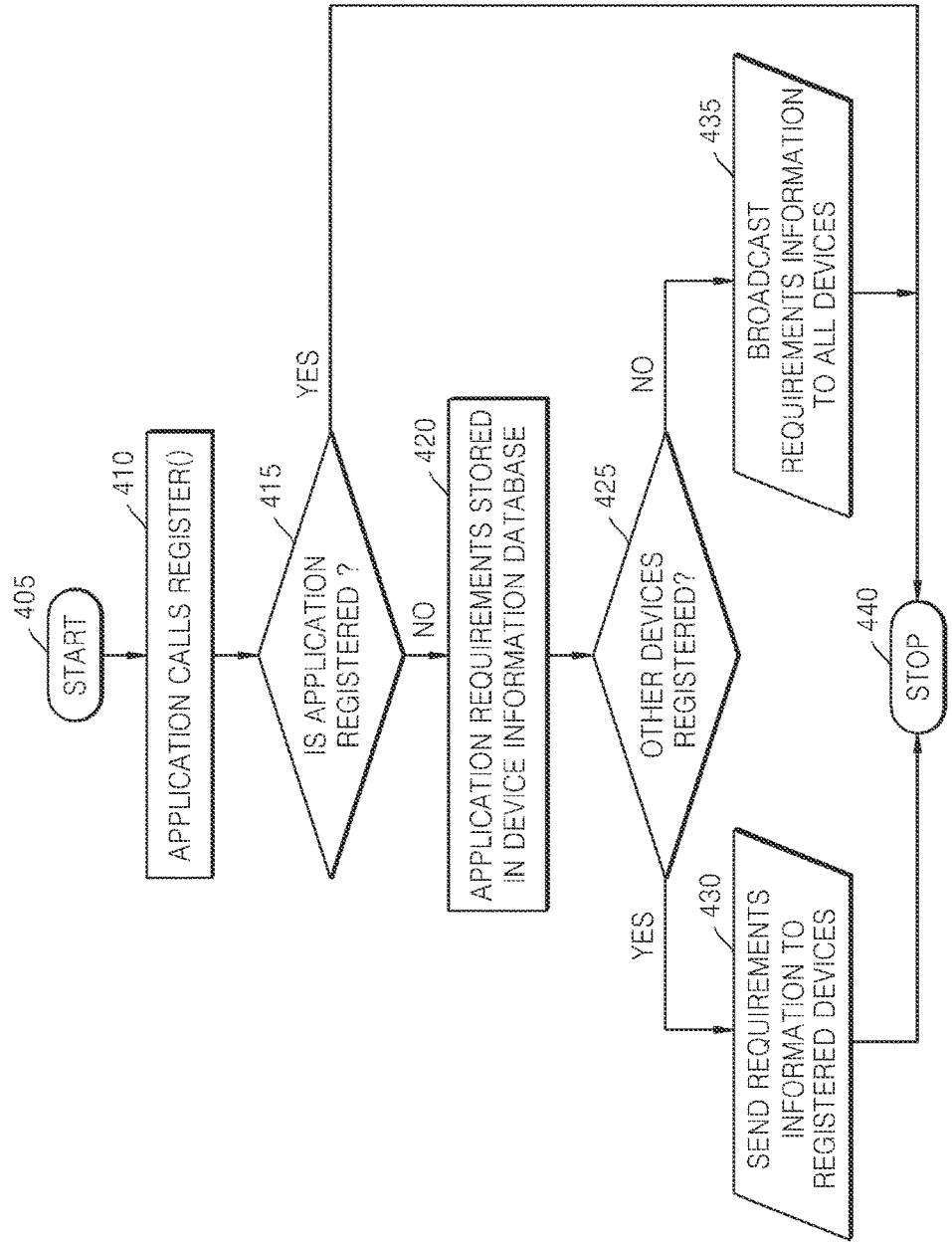
FIG. 4 is a flowchart illustrating registration process of an application to RSI layer, in accordance with another embodiment of the present invention.

FIG. 4 is a flowchart illustrating registration process of an application to RSI layer, in accordance with another embodiment of the present invention. The flowchart begins at step 405.

At step 410 the application transmits data regarding requirements of the application to the RSI layer via Register( ) API. The application and the RSI layer reside in a first electronic device. The requirements of the application include but are not limited to software specifications and hardware specifications required by the application to deliver an optimal performance.

At step 415, the RSI layer checks if the application is registered in the first electronic device. The device information database stores the requirements of the application registered in the first electronic device. If the application is registered, the application performs step 440. If the application is not registered, step 420 is performed.

At step 420, the data regarding requirements of the application newly registered are stored in a device information database. An electronic device registered in the device information database has device capabilities of the electronic device stored in the device information database.

At step 425, the application checks if there are other electronic devices registered with the RSI layer. Step 430 is performed when other devices are registered in the device information database. Step 435 is performed on the lack of other electronic devices registered in the device information database.

At step 430 the application transmits the data regarding requirements of the application to the registered electronic devices. The application announces the requirements to the registered electronic devices via a SendMessage( ) API.

At step 435 the application broadcasts the data regarding requirements of the application to a plurality of electronic devices in vicinity of the first electronic device. The application broadcasts the requirements to the registered electronic devices via the SendMessage( ) API.

The flowchart ends at step 440.

Figure 5:
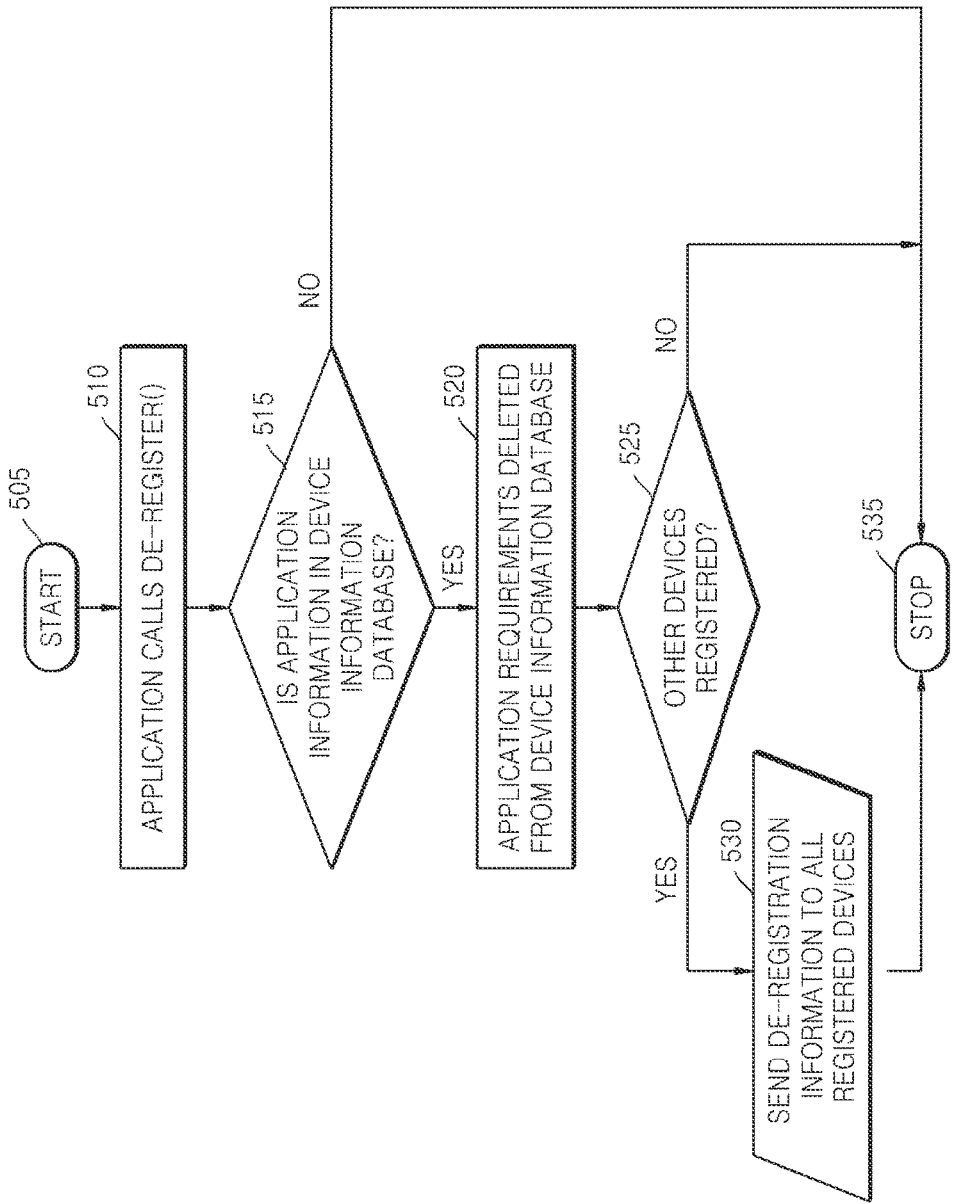
FIG. 5 is a flowchart illustrating de-registration process of an application from RSI layer, in accordance with yet another embodiment of the present invention.

FIG. 5 is a flowchart illustrating de-registration process of an application from RSI layer, in accordance with yet another embodiment of the present invention. The application resides in a first electronic device.

At step 510 the application transmits data regarding de-registration of the application from the RSI layer via De-Register( ) API.

At step 515, registration of the application with the RSI layer is confirmed by searching for data regarding requirements of the application in a device information database. The de-registration process proceeds to step 520 if the registration of the application is confirmed. Step 535 is performed if the application is not registered.

At step 520, the data regarding requirements of the application stored in a device information database are deleted. An electronic device registered in the device information database has device capabilities of the electronic device stored in the device information database.

At step 525, the application checks if there are other electronic devices registered with the RSI layer. Step 530 is performed when other registered devices are registered in the device information database. Step 535 is performed on finding lack of other electronic devices registered in the device information database.

At step 530, the application transmits the data regarding de-registration of the application to the registered electronic devices.

The flowchart ends at step 535.

Figure 6:
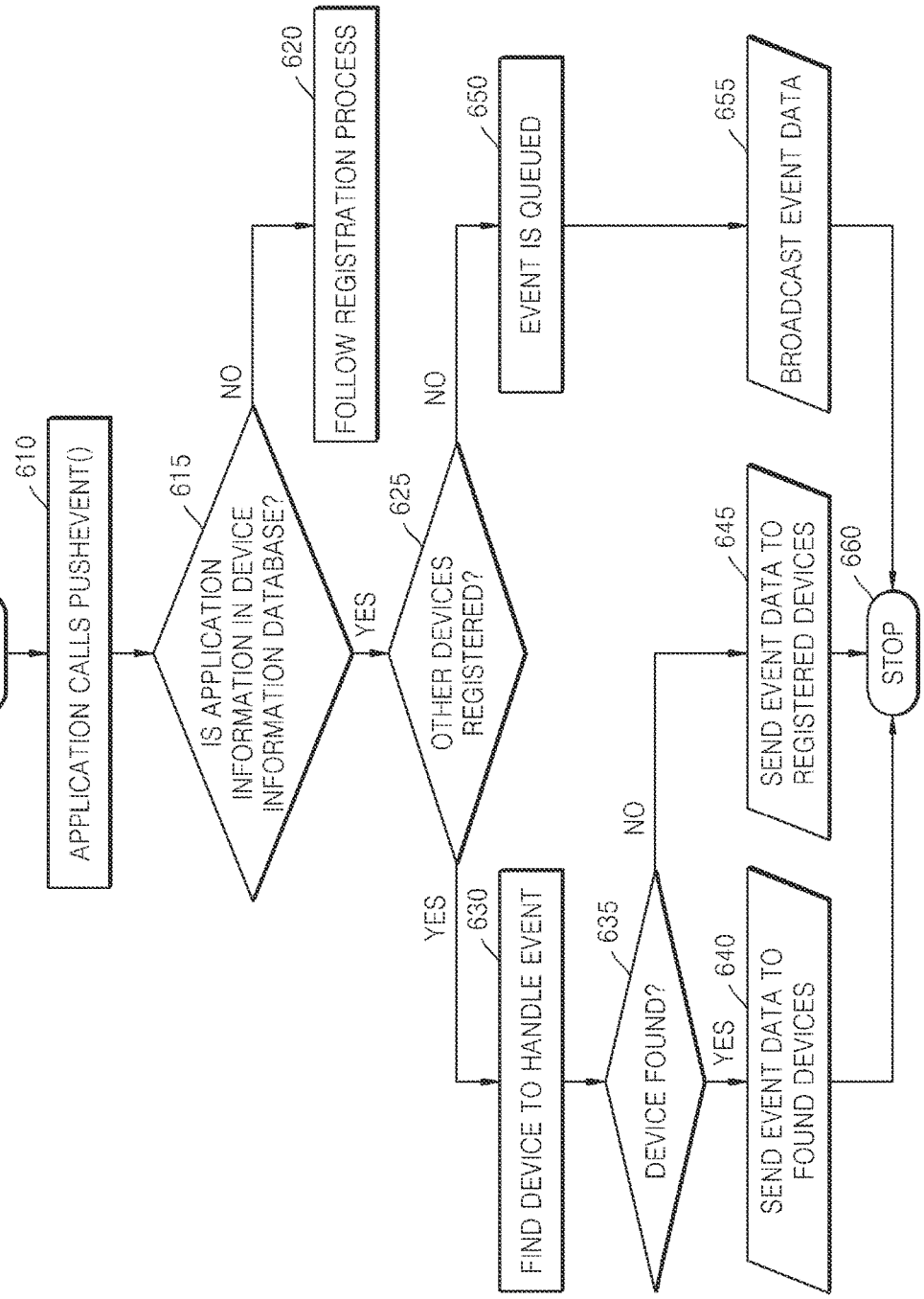
FIG. 6 is a flowchart illustrating steps involved in communicating event details by RSI layer with network abstraction layer, in accordance with one embodiment of the present invention.

FIG. 6 is a flowchart illustrating steps involved in communicating event details by RSI layer with network abstraction layer, in accordance with one embodiment of the present invention. The flowchart begins at step 605.

At step 610, an application residing in a first electronic device transmits an event to the RSI layer via a PushEvent( ) API.

At step 615, registration of the application with the RSI layer is confirmed by searching for data regarding requirements of the application in a device information database. Step 620 is performed if the application is not registered. Step 625 is performed if the device is registered.

At step 620, the RSI layer performs the application registration process. The application registration process registers the application in the RSI layer and stores the requirements of application in the device information database.

At step 625, the RSI layer checks for other electronic devices registered in the device information database. Step 630 is performed if the RSI layer finds registered electronic devices. Step 650 is performed if other registered electronic devices are found lacking in the device information database.

At step 650, the event is queued in an event queue in the RSI layer.

At step 655, the event is broadcasted to a plurality of electronic devices in the vicinity of the first electronic device. The RSI layer broadcasts the event via a SendMessage( ) API after a random time interval.

At step 630, a resource sharing and scheduling module breaks the event to tasks and subtasks and finds an electronic device capable of handling the event. The resource sharing and scheduling module finds the electronic device based on data associated with the event and device capabilities of registered electronic devices in a device information database.

At step 635, the RSI layer checks if the electronic device has been found. Step 645 is performed if the resource sharing and scheduling module fails to find the electronic device. Step 640 is performed if the electronic device is found.

At step 640, the RSI layer transmits the event to the electronic device capable of utilizing the shared application The RSI layer transmits the event via the SendMessage( ) API after the random time interval. The output of the shared application is rendered in the electronic device.

At step 645, the RSI layer broadcasts the event to the registered electronic devices in the device information database. The RSI layer broadcasts the event via a SendMessage( ) API after the random time interval.

The flowchart ends at step 660.

Figure 7:
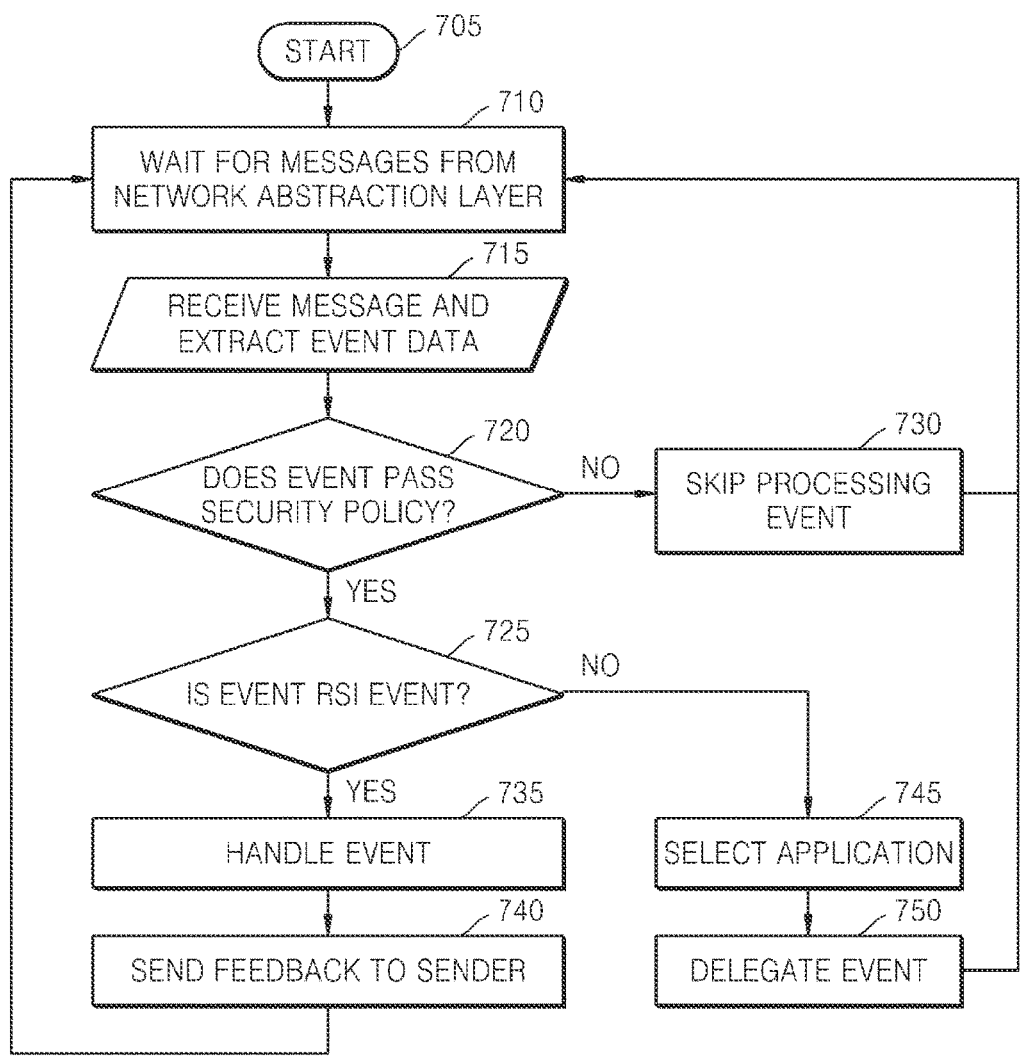
FIG. 7 is a flowchart illustrating steps involved in processing messages received by RSI layer, in accordance with another embodiment of the present invention.

FIG. 7 is a flowchart illustrating steps involved in processing messages received by RSI layer, in accordance with another embodiment of the present invention. The flowchart begins at step 705.

At step 710, the RSI layer waits for a message from a Network Abstraction layer. The RSI layer receives the message via a ReceiveMessage( ) API. The message is sent to the network abstraction layer from a registered electronic device.

At step 715, the RSI layer receives the messages via a ReceiveMessage( ) API. The RSI layer extracts an event data from the message.

At step 720, the RSI layer checks whether the event passes a security policy of the RSI layer. Step 720 includes authenticating the event and the registered electronic device sending the event. Step 730 is performed if the event fails to pass the security policy. Step 725 is performed if the event passes the security policy.

At step 730 the RSI layer skips processing the event and performs step 710. Moreover, the RSI layer sends a security failure status message to the sender electronic device.

At step 725, the RSI layer checks whether the event is an RSI layer event. The RSI layer event carries information regarding process to be performed in the RSI layer. Step 735 is performed if the event is the RSI layer event. Step 755 is performed if the event is the application event.

At step 735, the RSI layer handles the RSI layer event depending on the event details. The RSI layer performs procedures included in the RSI layer event. Data associated with the events are handled by an event manager in the RSI layer.

At step 740, the RSI layer sends a feedback message to the sender electronic device and performs step 710.

At step 745, the RSI layer selects an application for the application event. The RSI layer selects an application in an application layer based on data included in the application event and requirements of the application.

At step 750, the RSI layer delegates the application event to the application for processing and performs step 710.

Figure 8:
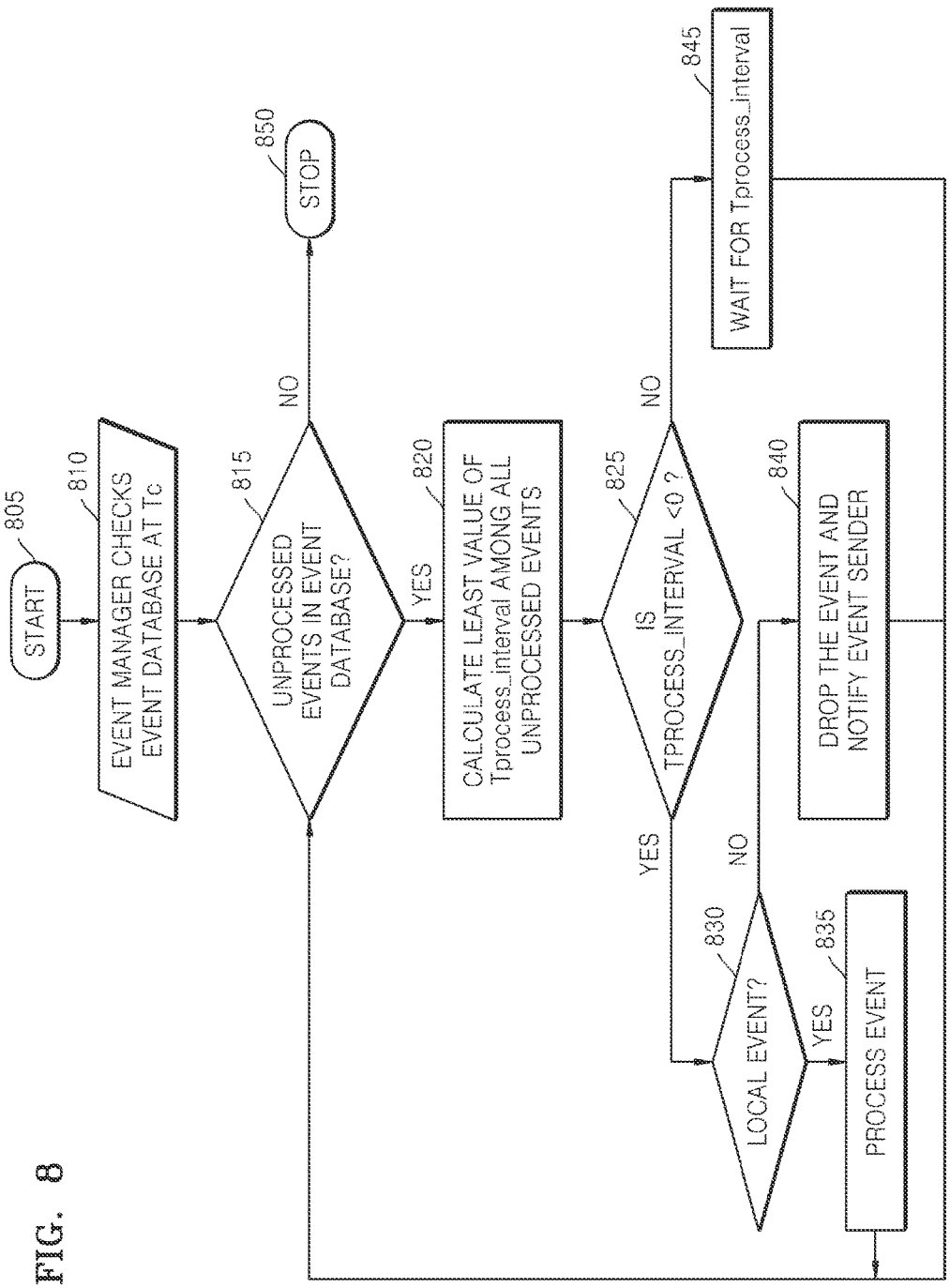
FIG. 8 is a flowchart illustrating the steps involved in handling unprocessed events, in accordance with yet another embodiment of the present invention.

FIG. 8 is a flowchart illustrating the steps involved in handling unprocessed events, in accordance with yet another embodiment of the present invention. A process illustrated by the flowchart begins at step 805.

At step 810 an event manager reads an event database at a first time interval TC.

At step 815, the event manager checks the event database for the unprocessed events in the event database. Step 850 is performed if the event manager fails to find the unprocessed events. Step 820 is performed if the event manager finds an unprocessed event in the event database.

At step 850, the process stops if the event manager fails to find the unprocessed events.

At step 820, the RSI layer calculates a least value for a time interval TPROCESS_INTERVAL for among the TPROCESS_INTERVALS calculated for each event among the plurality of unprocessed events in the event database.

At step 825, the RSI layer checks if the least value for the time interval TPROCESS_INTERVAL is lesser than zero. Step 830 is performed if the least value for the time interval TPROCESS_INTERVAL is less than zero. Step 845 is performed if the least value for the time interval TPROCESS_INTERVAL is greater than zero.

At step 845 the RSI layer waits for a time interval equal to the least value for the time interval TPROCESS_INTERVAL. The RSI layer performs step 815 after waiting.

At step 830 the RSI layer checks if the unprocessed event is a local event. The local event is an event generated and requested within an electronic device with the RSI layer. Step 840 is performed if the unprocessed event is not the local event. Step 835 is performed if the unprocessed event is the local event.

At step 835 the unprocessed event is processed. The RSI layer performs one of sending the unprocessed event to a different electronic device and sending the event to an application in an application layer. After processing the event the process of handling unprocessed events proceed to step 815 and checks for further unprocessed events.

At step 840 the unprocessed event is dropped and the sender electronic device is notified. The process proceeds to step 815 to check for unprocessed events and the process repeats.

Figure 9:
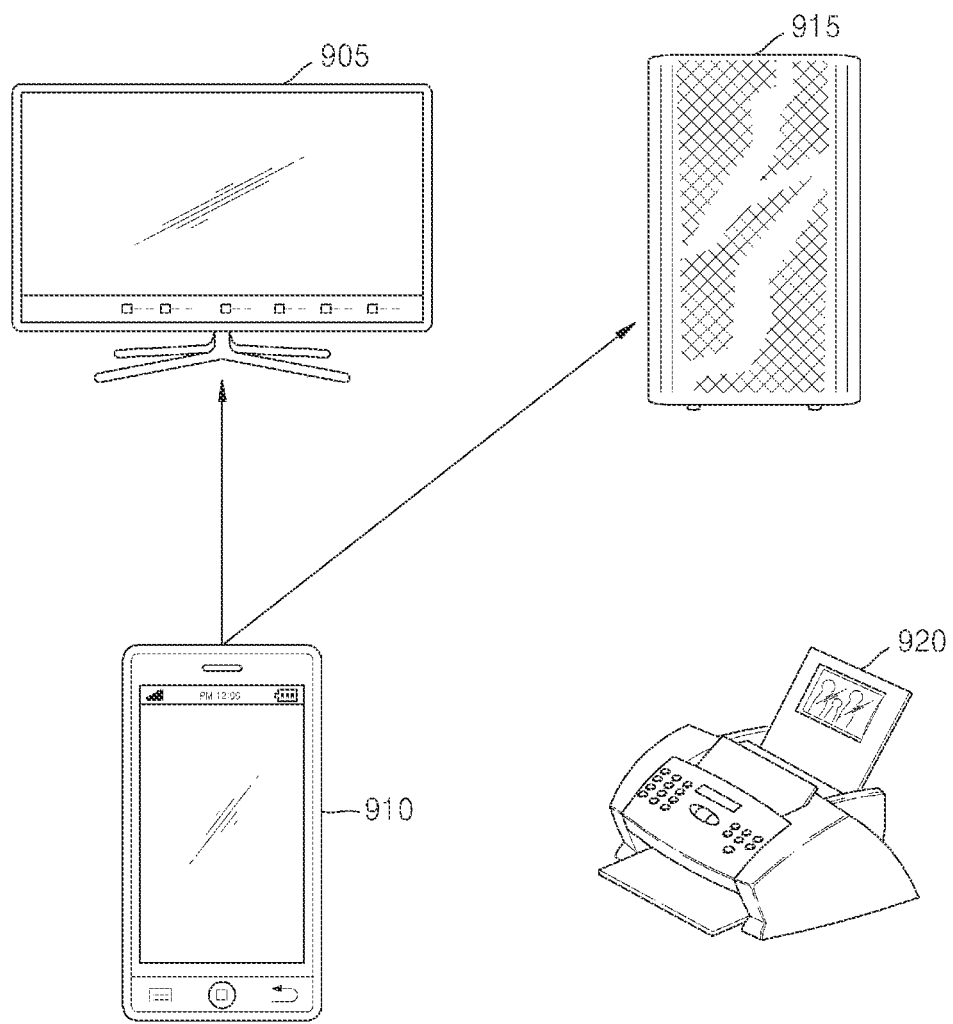
FIG. 9 is an exemplary illustration of sharing an application among a plurality of electronic devices.

FIG. 9 is an exemplary illustration of a use case, wherein an application is shared among a plurality of electronic devices. FIG. 9 includes a smart television 905, a smart phone 910, a smart music system 915, and a printer 920. The smart television 905, the smart phone 910, the smart music system 915, and the printer 920 have inbuilt Resource Sharing Infrastructure (RSI) layers and communicate with each other via a network. Examples of networks include but are not limited to WIFI-Direct based networks, Sound based communication networks, multimedia based communication networks like image and video, ZigBee, WIFI and Bluetooth networks.

In one embodiment of the present invention, an application to play high definition graphics and audio is stored in the smart phone 910. The smart phone 910 has a processor speed higher than the processor speeds of the smart television 905, and the smart music system 915. However, the smart television 905 has graphics rendering capability superior to the smart phone 910. The smart music system 915 has audio rendering capability much superior to the smart phone 910.

The RSI layer enables the sharing of the application residing in the smart phone 910 with the smart television 905 and the smart music system 915. However, execution of the application occurs in a processor in the smart phone 910. A resource sharing and scheduling module in the smart phone 910 breaks the application into tasks and subtasks. The resource sharing and scheduling module delegates tasks and sub-tasks based on device capabilities of the smart television 905 and the smart music system 915. The device capabilities are stored in a device information database. The resource and scheduling module delegates the smart television 905 to render the high graphics frame data and the smart music system 915 to render the high quality audio data based.

High graphics frame data output by the application executed by the processor in the smart phone 910 is transmitted to the smart television 905. The smart television 905 renders the high graphics frame data with the graphics rendering capability existent in the smart television 905. As a result, the smart television 905 delivers optimal performance for the application as a consequence of having graphics rendering capability superior to the smart phone 910.

High quality audio data output by the application executed by the processor in the smart phone 910 is transmitted to the smart music system 915. The smart music system 915 renders the high quality audio data with the audio rendering capability existent in the smart music system 915. As a result, the smart music system 915 delivers optimal performance for the application as a consequence of having audio rendering capability superior to the smart phone 910.

According to another embodiment of the present invention, control over the execution of the application is provided to one of the smart television 905 and the smart music system 915.

FIG. 10 is an exemplary illustration of sharing an application between two electronic devices. The exemplary illustration of FIG. 10 includes a first smart phone 1005 and a second smart phone 1010. The second smart phone 1010 is registered to the first electronic device 1005. The first smart phone 1005 executes a worksheet application 1015 and a gaming application 1020.

The worksheet application 1015 is controlled via a first input terminal in the first smart phone 1005. The gaming application 1020 is shared to the second smart phone 1010. The gaming application 1020 is played on a display 1025 of the second smartphone 1020.

A user with the second smart phone 1010 receives output of the gaming application via an output terminal of the second smart phone 1010 and the display 1025. The user controls the gaming application 1020 via a second input terminal in the second smart phone 1010. However, the execution of the gaming application 1020 occurs in a processor in the first smart phone 1005.

Advantageously, the embodiments specified in the present disclosure enables a first electronic device to share an application among a plurality of electronic devices. The present invention permits a second electronic device to receive the application. The application is executed in a processor in the first electronic device. The present invention permits the second electronic device to control the execution of the application and to render the output data of the application. The present invention provides a secure platform for management of multiple applications on an electronic device. Further, the present invention is based on scalable and fault tolerant distributed architecture. Moreover, the present invention permits the development of protocol and device independent applications for electronic devices.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below.

Accordingly, the specification and figures are to be regarded as illustrative examples of the present disclosure, rather than in restrictive sense. All such possible modifications are intended to be included within the scope of present disclosure.

What is claimed is:

1. A method of sharing output data of an application among a plurality of electronic devices, the method comprising:
   executing the application in the first electronic device, wherein execution is performed by utilizing processor resources in the first electronic device;
   selecting, among the plurality of electronic devices, at least one recipient electronic device capable of rendering the output data resulting from the execution of the application based on at least one of information regarding requirements of the application to be shared and information regarding device capabilities of the recipient electronic device;
   transmitting the output data resulting from the execution of the application to the selected at least one recipient electronic device such that the output data of the application is rendered in the selected at least one recipient electronic device; and
   receiving a user input to control the application from the selected at least one recipient electronic device and executing the application using the received user input.

2. The method as claimed in claim 1, wherein the plurality of electronic devices include but is not limited to mobile phones, smart phones, smart televisions, smart music player, and tablet computers.

3. A method of sharing output data of an application among a plurality of electronic devices, the method comprising:
   registering the plurality of electronic devices to a first electronic device;
   storing information regarding device capabilities of the plurality of electronic devices in a device information database;
   registering the application in the first electronic device, wherein registering involves storing information regarding requirements of the application in the device information database;
   generating an event on registration of the application wherein the event is generated in an application layer of the first electronic device;
   communicating the event with a Resource Sharing Infrastructure (RSI) layer via a first application program interface (API);
   selecting, from the plurality of electronic devices, at least one recipient electronic device capable of rendering the output data resulting from the execution of the application based on at least one of the information regarding requirements of the application to be shared and the information regarding device capabilities of the recipient electronic device;
   sending a first message to the second electronic device via the first API wherein the message is generated from the event;
   receiving a second message from the second electronic device via a second API;
   authenticating the second electronic device and the shared application;
   maintaining synchronization of the first electronic device and the second electronic device;
   executing the application in the first electronic device, wherein execution is performed by utilizing processor resources in the first electronic device;
   transmitting the output data resulting from the execution of the executed application to the second electronic device; and
   receiving a user input to control the application from the second electronic device and executing the application using the received user input.

4. The method as claimed in claim 3, wherein the information regarding device capabilities comprises availability, software capability, and hardware capabilities of electronic device among the plurality of electronic devices.

5. The method as claimed in claim 3, wherein the event is generated based on the application and is a means for communication among the plurality of electronic devices.

6. The method as claimed in claim 3, wherein the authentication is performed based on the security measures including but not limited to user based security measures, content based security measures, and hardware based security measures.

7. The method as claimed in claim 3, wherein the network abstraction layer enables sending and receiving messages via communication protocols including, but not limited to wireless local area network (LAN), near field communication (NFC), Bluetooth, Sound based communication, Multimedia based communication like Image and Video.

8. An electronic device for sharing output data of an application with at least one of a plurality of other electronic devices, the electronic device comprising:
   a memory comprising one or more instructions executable by a hardware processor; and
   the hardware processor which executes the one or more instructions stored in the memory, the hardware processor being operable, when executing the instructions, to:
      execute the application in the electronic device, using a hardware processor resources in the electronic device;
      select, among the plurality of other electronic devices, at least one recipient electronic device capable of rendering the output data resulting from the execution of the application based on at least one of information regarding requirements of the application to be shared and information regarding device capabilities of the plurality of other electronic devices;
      transmit the output data resulting from the execution of the application to the selected at least one recipient electronic device such that the output data of the application is rendered in the selected at least one recipient electronic device; and
      receive a user input to control the application from the second electronic device and execute the application using the received user input.

9. The electronic device as claimed in claim 8, wherein the information regarding device capabilities comprises availability, software capability, and hardware capabilities of electronic device among the plurality of electronic devices.

10. The electronic device as claimed in claim 8, wherein the hardware processor is further operable, when executing the instructions, to:
    authenticate the at least one recipient electronic device and the shared application.

11. The electronic device as claimed in claim 8, wherein the hardware processor is further operable, when executing the instructions, to: break the application to tasks and sub-tasks.

12. The electronic device as claimed in claim 11, wherein the hardware processor is further operable, when executing the instructions, to:
  allocate the tasks and sub-tasks to the at least one recipient electronic device based on information regarding device capabilities of the at least one recipient electronic device.

13. The electronic device as claimed in claim 8, wherein the hardware processor is further operable, when executing the instructions, to:
  synchronize the electronic device with the at least one recipient electronic device receiving the application.

14. The electronic device as claimed in claim 8, wherein the memory further comprises:
  an application layer for storing applications capable of being shared among the plurality of other electronic devices;
  a network abstraction layer for communicating information with the plurality of other electronic devices; and
  a Resource Sharing Infrastructure (RSI) layer for facilitating resource sharing, wherein the RSI layer comprises:
    a device information database for storing the information regarding device capabilities of the plurality of other electronic devices;
    a device grouping module for managing information regarding the plurality of other electronic devices;
    an event manager for handling network events related to sharing of the application;
    an event database to store an event queue, wherein the event queue stores unprocessed events;
    a security enforcement manager for enforcing security measures in the RSI layer;
    a resource sharing and scheduling manager for scheduling tasks for the plurality of other electronic devices; and
    a communication manager for maintaining communication with the network abstraction layer wherein the communication manager maintains communication via a first Application Program Interface (API) and a second API.

15. The method as claimed in claim 1,
wherein the selecting further comprises:
  dividing the output data resulting from the execution of the application into one or more task; and
  selecting one or more recipient electronic device capable of rendering the one or more task, such that each of the one or more recipient electronic device is selected to render corresponding each one of the one or more task according to device capabilities of the each of the one or more recipient electronic device, and
wherein the transmitting further comprises:
  transmitting the each one of the one or more task to the corresponding each one of the one or more recipient electronic device such that the each one of the one or more task is rendered in the corresponding each one of the one or more recipient electronic device.

16. The method as claimed in claim 1,
wherein the selecting further comprises:
  dividing the output data resulting from the execution of the application into audio task and video task; and
  selecting an audio device capable of rendering the audio task and a video device capable of rendering the video task, and
wherein the transmitting further comprises:
  transmitting the audio task to the selected audio device and the video task to the selected video device.

* * * * *